United States Patent
Nakajima

(10) Patent No.: US 7,429,103 B2
(45) Date of Patent: Sep. 30, 2008

(54) METHOD OF INKJET RECORDING

(75) Inventor: Atsushi Nakajima, Hachioji (JP)

(73) Assignee: Konica Minolts Holdings, Inc., Tokyo (JP)

(\*) Notice: Subject to any disclaimer, the term of this patent is extended or adjusted under 35 U.S.C. 154(b) by 288 days.

(21) Appl. No.: 10/538,329

(22) PCT Filed: Dec. 17, 2003

(86) PCT No.: PCT/JP03/16152

§ 371 (c)(1),
(2), (4) Date: Jun. 10, 2005

(87) PCT Pub. No.: WO2004/056579

PCT Pub. Date: Jul. 8, 2004

(65) Prior Publication Data

US 2006/0055752 A1 Mar. 16, 2006

(30) Foreign Application Priority Data

Dec. 19, 2002 (JP) ............................. 2002-368029

(51) Int. Cl.
*B41J 2/01* (2006.01)
(52) U.S. Cl. .................. 347/102; 347/100; 347/101
(58) Field of Classification Search ............. 347/100, 347/95, 96, 101, 102; 106/31.6, 31.13, 31.27; 523/160
See application file for complete search history.

(56) References Cited

U.S. PATENT DOCUMENTS 5,213,873 A \* 5/1993 Yasuda et al. ............... 347/105

2003/0179270 A1 9/2003 Yamamoto et al.
2003/0184632 A1 10/2003 Suzuki
2003/0194539 A1 \* 10/2003 Ohya et al. ................ 428/195

FOREIGN PATENT DOCUMENTS

| EP | 1 348 566 A | | 10/2003 |
|----|---|---|---|
| JP | 05-186725 | \* | 7/1993 |
| JP | 5-186725 A | | 7/1993 |
| JP | 2000-117960 A | | 4/2000 |
| JP | 2002-137375 A | | 5/2002 |
| JP | 2002-275403 A | | 9/2002 |
| JP | 2002-275404 A | | 9/2002 |
| WO | WO 02/18144 A | | 3/2002 |
| WO | WO 02/18144 A1 | | 3/2002 |

OTHER PUBLICATIONS

Shikizai Kyokaishi, Journal of the Japan Society of Colour Material, vol. 75, No. 8, pp. 394-400 (Aug. 2002).

\* cited by examiner

*Primary Examiner*—Manish S Shah
(74) *Attorney, Agent, or Firm*—Frishauf, Holtz, Goodman & Chick, P.C.

(57) ABSTRACT

An ink-jet rebording method for recording images on a base material by jetting UV-setting ink-jet ink which contains at least color materials, UV-polymeric compound, and photo induced polymerization initiator in a water-based medium onto the base material, wherein ultraviolet rays are applied to the jetted inks within a contact time in which the rate of ink transfer to the base material is less than 20 ml/m$^2$ (by the Bristow method) after the ink reaches the base material.

3 Claims, No Drawings

METHOD OF INKJET RECORDING

This application is the United States national phase application of International Application PCT/JP2003/016152 filed Dec. 17, 2003.

TECHNICAL FIELD

This invention relates to an image forming method which forms and fixes images by an ink jet recording system which uses UV-setting ink-jet ink which can react and harden when exposed to ultraviolet rays. Particularly, this invention relates to an ink jet recording method which uses UV-setting inks made of water-based media and forms high-quality recorded images.

BACKGROUND

Recently, UVIJ recording systems which use UV-setting inks have been developed as ink jet recording systems which can record images on base materials having no particular ink image receiving layer. Presently, their improvements have been made vigorously.

The UV-setting inks are loosely divided into two solventless UV ink which hardly contains non-hardening solvent and water-based UV ink in which a photo-induced polymeric compound is dissolved or dispersed in a water-based medium.

The solventless UV ink has merits of fast recording and already been in practical use since the ink can be hardened and dried simply by exposure to UV light and that the ink produces no harmful substance such as VOC.

However, the solventless UV ink does not shrink during hardening and leaves mounds of ink fixed on the recording paper. This unlevelling can be smoothed to some extent by optimization of UV exposure timing and improvement of ink properties, but dot blurring and excessive glossiness will make the printout different from what is obtained by regular printing.

Meanwhile, the water-based UV ink has features that the water-based UV ink can use polymeric compound of higher viscosity than the solventless UV ink since the water-based UV ink using a water-based medium is diluted by a water-based solvent, that the water-based UV ink can reduce the ink volume and improve the image quality on the base material by evaporating the water medium from the UV-set ink, and that the water-based UV ink is available to the thermal type ink jet recording method.

If the base material is insufficient in the absorptivity of water-based media, the base material may cause dot-blurring, make the UV-hardened ink film fragile, and increase the load to dry the water-based medium. Contrarily, if the absorptivity of water-based media is too high, the ink component and the polymeric component go deeper into the base material and the image density cannot be enough. Further, the ink in the deep part of the base material cannot be fully hardened because the ultraviolet rays cannot reach there. Unhardened ink contains acrid monomers which are harmful to human bodies.

The above features and problems of the UV ink jet recording system are, for example, outlined by "Outlook of UV ink-jet technology" 2002 ("Color materials," p. 75, (8), and p. 394-p. 400).

In any case, since the water-based UV ink can reduce the volume of the printed ink, the images printed with the water-based UV inks are less textured than those printed with the solventless UV inks. However, to make the best of the features of the water-based UV ink, any contrivances are required judging from the affinity with the base materials. Without them, the water-based UV ink is hard to be put into practical use.

Japanese Non-Examined Patent Publication 2000-117960 discloses a printing method using water-based UV inks whose contact angle is 60 degrees or less to a base material which absorbs no or little ink in order to form high density, glossy, and color-saturated images.

However, the above patent document discloses an example of applying ultraviolet rays to jetted inks a few seconds later after the ink droplets hit the surface of a base material. This example cannot be free from image blurring due to mixture of ink droplets. Further, this example requires only base materials that absorb no or little ink. Furthermore, this example has a great drying load to remove solvent components of the ink.

[Patent Document 1]
Japanese Non-Examined Patent Publication 2000-11796.

[Non-Patent Document 1]
Outlook of UV ink-jet technology 2002 ("Color materials," p. 75, (8), and p. 394-p. 400))

SUMMARY

An object of this invention is to provide an ink jet recording method which uses water-based UV-setting inks and base materials capable of absorbing water-based media and forms high quality images without image blurring, insufficient ink hardening, and heavy drying load.

1) To attain the above object, one embodiment of this invention is an ink jet recording method for recording images on a base material by jetting UV-setting ink-jet ink which contains at least color materials, UV-polymeric compound, and photo-induced polymerization initiator in a water-based medium onto the base material, wherein ultraviolet rays are applied to the jetted inks within a contact time in which the rate of ink transfer to the base material is less than 20 ml/m$^2$ (by the Bristow method).

(2) The ink-jet recording method of (1), wherein the ink transfer rate is 20 ml/m$^2$ or more when the contact time of the ink on the base material is 2 seconds (by the Bristow method).

(3) The ink-jet recording method of (1) or (2), wherein the method further comprises a step of removing the water-based medium from the ink after hardening the ink by ultraviolet rays.

In other words, structure (1) of this invention applies ultraviolet rays to the jetted ink before the ink permeation into the base material starts (within a preset contact time). This can hold the color material of the ink on the surface of the base material, increase the density of the image, and fully harden the ink.

For this purpose, the ultraviolet rays should be applied earlier after the ink droplets hit the base material surface if the ink absorption rate of the base material is greater. In other words, the ultraviolet rays should be applied within a contact time in which the rate of ink transfer to the base material is less than 20 ml/m$^2$, and preferably 10 ml/m$^2$ or less.

Further, the ultraviolet rays should be applied within a contact time in which the rate of ink transfer to the base material is 5 ml/m$^2$ or more. If the ultraviolet rays are applied at a timing of under this contact time (less than 5 ml/m$^2$), the ink dot sizes may be insufficient and the jetted inks may be hardened insufficiently. The ultraviolet rays can be applied immediately after the ink droplets hit the base material surface when the roughness index Kr (ml/m$^2$, measured by the Bristow method) of the base material is 5 ml/m$^2$ or more.

As defined by structure (2), if the liquid transfer rate is 20 ml/m² or more when the time during which the ink is in contact with the base material (as the contact time) is 2 seconds, the base material can absorb the remaining waterbased medium even after the ink is hardened by the ultraviolet rays. This can reduce the drying load greatly. The preferable liquid transfer rate is 25 ml/m² or more.

The liquid transfer rate by the Bristow method can be measured by a Bristow tester in accordance with JAPAN TAPPI UM405.

In other words, judging from structures (1) and (2), it is apparent that preferable base materials are greater in ink absorptivity but smaller in ink absorption rate.

Further as defined by structure (3), it is possible to improve the strength of formed images by removing the water-based media from the base material by drying up.

DESCRIPTION OF THE PREFERRED EMBODIMENT

[UV Setting Ink]

The ink compositions disclosed by Japanese Non-Examined Patent Publication 2000-117960 are directly available for UV setting inks which contain at least color materials, UV polymeric substances, and photopolymerization initiators in a water-based medium.

A representative ink composition is an aqueous solution of pigments (Pigment Yellow 74, Pigment Red 122, Pigment Blue 15:3, and Pigment Black 7) as color materials, low-viscosity and high reactivity water-soluble UV polymeric compound (Compound 1),

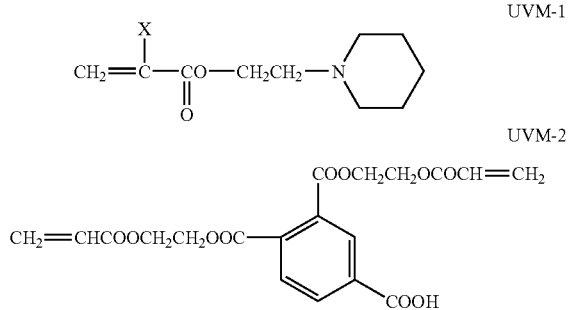

and water-soluble photo-induced polymerization initiator (Compound 2).

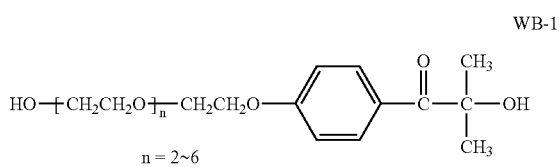

In this invention, the rate of ink transfer to the base material (measured by the Bristow method) has a great influence upon the timing of application of ultraviolet rays to the ink. It is possible to control the absorptivity of ink to the base material by adding adequate surface active agents and water-soluble solvents to the ink.

[Base Material]

This invention applies ultraviolet rays to the ink within a contact time in which the rate of ink transfer to the base material (ink transfer rate) is less than 20 ml/m². Finally, the ink transfer rate should preferably be 20 ml/m² or more when the contact time (during which the ink is in contact with the base material) is 2 seconds (measured by the Bristow method). If the ink transfer rate. is less than 20 ml/m², the drying load increases and any unhardened ink may contaminate the support member conveying member.

Although the time period between landing of an ink droplet and application of ultraviolet rays to the ink droplet should be within a contact time during which the ink transfer rate is less than 5 to 20 ml/m², the time should normally be 0.01 to 5 seconds and preferably 0.01 to 2 seconds to prevent ink blurring. In other words, it is preferable that the base material absorbs more ink but more slowly.

Specifically, a preferable base material is made of paper which mainly contains cellulose capable of absorbing water-based media efficiently and sized to reduce the water permeability of the paper. Such base materials are printing art paper, coated paper, matted paper, bond paper, finely coated paper, and copying paper which are surface-treated with water-based resins and fine particles.

The absorption rates (speeds) and volumes of the ink and the base material can be adjusted by controlling the surface tension of the ink and the surface wettability, water resistance, and porosity of the base material.

[Applying Ultraviolet Rays]

The printing system in accordance with this invention should provide a UV light source in the ink-jet mechanism.

A representative ultraviolet light source applies ultraviolet rays to the upper side, the lower side, or both sides of a recording sheet coming out of a print station. When a transparent base material is used, the ultraviolet light can be applied comparatively easily.

The timing to apply ultraviolet rays should be within a contact time at which the ink transfer rate is 20 ml/m² is less. If the timing is after the contact time, the ink goes deeper into the base material. As the result, the image density becomes lower and the ink is not fully hardened.

Preferable ultraviolet lamps are so-called low-pressure mercury lamps, high-pressure mercury lamps, and fluorescent mercury lamps whose mercury vapor pressure is 1 to 10 Pa while they are on. The UV emission spectrum of these UV lamps is in the range of 184 to 450 nm and is suited to efficiently react the polymeric substances in the black or colored inks. Further, each of these UV light sources uses a small power source and can save a space in the printer. Representative mercury lamps are metal halide lamps, high-pressure mercury lamps, very-high-pressure mercury lamps, Xenon flash lamps, deep UV lamps, and so on.

In addition to the above, light-emitting diodes of UV-laser and UV-emission types which are now in practical use have the above emission wavelength range. Therefore, when their power source sizes, input intensities, and shapes are acceptable, they are basically available as the UV light sources. The light sources are selected also by the sensitivities of catalysts in the ink.

When hardened and fixed by ultraviolet rays, the ink can have good fixability, scratch-resistance, and water-resistance. Further, this also suppresses paper deformation (e.g. curling), which is facilitates paper handling and storage.

The required UV intensity is about 2 to 1000 mW/cm². This is preferable judging from the speed of polymerization of the ink components. If the accumulated UV dose is insufficient, the hardened ink is not fully adhesive to the surface of the recording paper and not fully water-resistant in color recording. In other words, the printed ink images are not so tough and strong.

[Drying Mechanism]

Basically, it is preferable that the printing method of this invention comprises the processes below.

(1) Process of printing images on a base material by the ink-jet printer
(2) Process of applying ultraviolet rays to the base material to polymerize the polymeric substances in the ink
(3) Process of removing solvent components from the base material The order of processes (2) and (3) can be reversed.

However, process (3) can be omitted if the ink contains a water-soluble organic solvent which is comparatively high volatile or when the ink contains no water-soluble organic solvent. A microwave generator, far-infrared lamp, or other heating method can be used to remove the solvent component.

Embodiment (1) Preparation of Inks
Prescription of Yellow Ink

TABLE 1

| Components | Composition (parts by mass) |
|---|---|
| Pigment-dispersion liquid (concentration: 10%) | |
| Pigment | 3.0 |
| Water | 27.0 |
| Water-soluble polymeric substance "UVM-2" | 4.0 |
| Water-soluble polymeric substance "UVM-1" | 13.0 |
| Water-soluble photopolymerization initiator "WB-1: n = 4" | 0.5 |
| Water | 52.5 |

* Pigment Yellow 74 dispersing element = Dispersing agent and Water-soluble polyurethane resin Prescription of Magenta Ink

TABLE 2

| Components | Composition (parts by mass) |
|---|---|
| Pigment-dispersion liquid (concentration: 10%) | |
| Pigment | 3.0 |
| Water | 27.0 |
| Water-soluble polymeric substance "UVM-2" | 4.0 |
| Water-soluble polymeric substance "UVM-1" | 13.0 |
| Water-soluble photopolymerization initiator "WB-1: n = 4" | 0.5 |
| Water | 64.7 |

* Pigment Red 122 dispersing element = Dispersing agent and Water-soluble polyurethane resin Prescription of Cyan Ink

TABLE 3

| Components | Composition (parts by mass) |
|---|---|
| Pigment-dispersion liquid (concentration: 20%) | |
| Pigment | 3.0 |
| Water | 12.0 |

TABLE 3-continued

| Components | Composition (parts by mass) |
|---|---|
| Water-soluble polymeric substance "UVM-2" | 4.0 |
| Water-soluble polymeric substance "UVM-1" | 13.0 |
| Water-soluble photopolymerization initiator "WB-1: n = 4" | 0.5 |
| Water | 67.5 |

* Pigment Blue 15:3 dispersing element = Dispersing agent and Water-soluble polyurethane resin Prescription of Black Ink

TABLE 4

| Components | Composition (parts by mass) |
|---|---|
| Pigment-dispersion liquid (concentration: 15%) | |
| Pigment | 3.0 |
| Water | 17.0 |
| Water-soluble polymeric substance "UVM-2" | 4.0 |
| Water-soluble polymeric substance "UVM-1" | 13.0 |
| Water-soluble photopolymerization initiator "WB-1: n = 4" | 0.5 |
| Water | 62.5 |

* Pigment Black 7 dispersing element = Dispersing agent and Water-soluble polyurethane resin (2) Base Material
Base materials below were used.
Base Material 1 (Coated Paper)

The contact time for the ink transfer rate of 20 ml/m$^2$ is 1.25 seconds (measured by the Bristow method) and the liquid transfer rate for the contact time of 2 seconds is $\geq$ml/m$^2$.

The test condition (for the Bristow method) was 23° C.±1° C. and 50%±2% RH. The test samples were kept for at least 2 hours in the above condition prior to the test.

Base Material 2 (Bond Paper)

The contact time for the ink transfer rate of 20 ml/m$^2$ is 0.8 seconds (measured by the Bristow method) and the liquid transfer rate for the contact time of 2 seconds is 28 ml/m$^2$.

The test condition (for the Bristow method) was 23° C.±1° C. and 50%±2% RH. The test samples were kept for at least 2 hours in the above condition prior to the test.

Base Material 3 (Hydrophilic PET Film)

A PET film was prepared with the surface coated with a hydrophilic resin. The contact time for the ink transfer rate of ml/m$^2$ is 2 seconds or more (measured by the Bristow method) and the liquid transfer rate for the contact time of 2 seconds is 15 ml/m$^2$.

The test condition (for the Bristow method) was 23° C.±1° C. and 50%±2% RH. The test samples were kept for at least 2 hours in the above condition prior to the test.

(3) Ink-jet Recording

Embodiment 1

An image pattern made with primary and secondary colors (yellow (Y), magenta (M), cyan (C), black (K), and their combinations) was recorded on the base materials by a piezo ink-jet recording device and hardedned by ultraviolet rays.

The conditions were as follows:
Recording density: 720 dots per inch (number of dots per 2.54 cm)
Maximum quantity of ink applied (solid printing, each color): 20 ml/m$^2$ Time between ink landing (each color) and UV application: 1 second (maximum)

UV intensity on recording surface: 1000 mW/cm$^2$ (365 nm, USHIO SP5 UV source)

Evaluation Criteria

Ink Density

○: High ink density in solid areas

×: Blurred image and low image density because the ink was absorbed too much into the base material Blurring ○: Smooth gradation without color blurring Δ: A little blurring and irregular gradation ×: Irregular gradation with color blurring Odor ○: A little monomer odor ×: Strong monomer odor due to unreacted monomer Drying Ability ○: Quick ink hardening by exposure to ultraviolet rays and reduction in surface tackiness ×: Some surface tackiness remaining on the ink surface after exposure to ultraviolet rays The result of evaluation is summarized below.

|  | Ink density | Blurring | Odor | Drying |
| --- | --- | --- | --- | --- |
| Base material 1 | ○ | ○ | ○ | ○ |
| Base material 2 | × | Δ | × | ○ |
| Base material 3 | ○ | Δ | ○ | × |

Embodiment 2

Embodiment 2 is the same as Embodiment 1, but the UV light sources were disposed to shorten the time between ink landing and UV exposure to 0.5 seconds (maximum). The result of evaluation is summarized below.

|  | Ink density | Blurring | Odor | Drying |
| --- | --- | --- | --- | --- |
| Base material 1 | ○ | ○ | ○ | ○ |
| Base material 2 | ○ | ○ | ○ | ○ |
| Base material 3 | ○ | Δ | ○ | × |

Embodiment 3

Embodiment 3 is the same as Embodiment 1, but the UV light sources were disposed to shorten the time between ink landing and UV exposure to 1.5 seconds (maximum). The result of evaluation is summarized below.

|  | Ink density | Blurring | Odor | Drying |
| --- | --- | --- | --- | --- |
| Base material 1 | × | Δ | × | ○ |
| Base material 2 | × | Δ | × | ○ |
| Base material 3 | ○ | × | ○ | × |

Embodiment 4

Embodiment 4 is the same as Embodiment 1, but the UV light sources were disposed to shorten the time between ink landing and UV exposure to 1.6 seconds (maximum). The result of evaluation is summarized below.

|  | Ink density | Blurring | Odor | Drying |
| --- | --- | --- | --- | --- |
| Base material 1 | × | Δ | × | ○ |
| Base material 2 | × | Δ | × | ○ |
| Base material 3 | ○ | × | ○ | × |

As seen in the above test results (base material 1 of Embodiment 1 and base materials 1 and 2 of Embodiment 2), the printed images are very good when the ultraviolet rays are applied within the contact time at which the ink transfer rate of the base material is less than 20 ml/m$^2$.

Embodiment 5

The recorded materials prepared by Embodiment 2 were dried by a far-infrared heater. As the result, the images printed on base material 1, 2, and 3 were strong enough and could not be damaged by finger-rubbing. However, to increase the image strength, the base material 3 must be dried longer because the ink transfer rate for the contact time of 2 seconds is a little smaller (15 ml/m$^2$).

INDUSTRIAL APPLICABILITY

This invention can provide an ink-jet recording method which can form optimum images (without image blurring, poor hardening, and heavy drying load) on base materials capable of absorbing water-based media with UV-setting inks which mainly comprises a water-based medium.

What is claimed is:

1. An ink-jet recording method of recording images on a base material, comprising the steps of:
    jetting UV-hardenable ink-jet ink toward the base material so as to form ink droplets on the base material, wherein the UV-hardenable ink-jet ink contains at least color materials, UV-polymerizable compound, and photo-polymerization initiator in an aqueous solution; and
    applying ultraviolet rays onto the ink droplets formed on the base material in such a way that the application of ultraviolet rays is started within a contact time in which an ink transfer amount of the ink of the ink droplets by Bristow method is 5 ml/m$^2$ or more and less than 20 ml/m$^2$.

2. The ink-jet recording method of claim 1, wherein the ink transfer amount is 20 ml/m$^2$ or more when the contact time of the ink droplets on the base material is 2 seconds by Bristow method.

3. The ink-jet recording method of claim 1, further comprising a step of removing the aqueous solution after hardening the ink droplets by the application of ultraviolet rays.

* * * * *